United States Patent [19]
Strock et al.

[11] Patent Number: 5,403,523
[45] Date of Patent: Apr. 4, 1995

[54] WET SCRUBBER INLET AWNING WITH LOW PRESSURE DROP

[75] Inventors: Thomas W. Strock, Jackson Township, Stark County; Wadie F. Gohara, Barberton, both of Ohio

[73] Assignee: The Babcock & Wilcox Company, New Orleans, La.

[21] Appl. No.: 236,617

[22] Filed: May 2, 1994

[51] Int. Cl.$^6$ ............................................. B01F 3/04
[52] U.S. Cl. .................................. 261/111; 261/117
[58] Field of Search ........................ 261/110, 111, 117

[56] References Cited

U.S. PATENT DOCUMENTS

| | | | |
|---|---|---|---|
| 1,172,930 | 2/1916 | Brassert et al. | 261/111 |
| 1,564,075 | 12/1925 | Lakin | 261/111 |
| 2,265,227 | 12/1941 | Coffoy | 261/111 |
| 2,603,464 | 7/1952 | Nevins et al. | 261/110 |
| 3,901,957 | 8/1975 | Levy | 261/117 |
| 4,328,176 | 5/1982 | Alt et al. | 261/111 |

FOREIGN PATENT DOCUMENTS 2636526 10/1977 Germany .............................. 261/117

Primary Examiner—Tim Miles
Attorney, Agent, or Firm—Robert J. Edwards; Eric Marich

[57] ABSTRACT

A device for deflecting a liquid slurry flow in a housing away from an inlet flue conveying hot flue gas to the housing, the device having an upper surface and communicating with the housing at an inner wall of the housing. An inlet awning having a bottom portion horizontally extends into the housing from an upper surface of the inlet flue. An inclined top portion is connected to the bottom portion and an inner wall of the housing, the top portion extending upwardly at an incline from the bottom portion to the inner wall of the housing, the top portion having sufficient area to collect liquid slurry in excess of that required to achieve instant cooling and humidification of the hot flue gas, the top and bottom portions forming a tip at an area where the top portion is connected to the bottom portion. An extension outwardly extends from the tip of the inlet awning and slightly below the bottom portion of the inlet awning in order to deflect the liquid slurry flow away from the bottom portion of the inlet awning to keep the bottom portion dry and thereby prevent build-up of slurry deposits at the inlet flue.

12 Claims, 9 Drawing Sheets

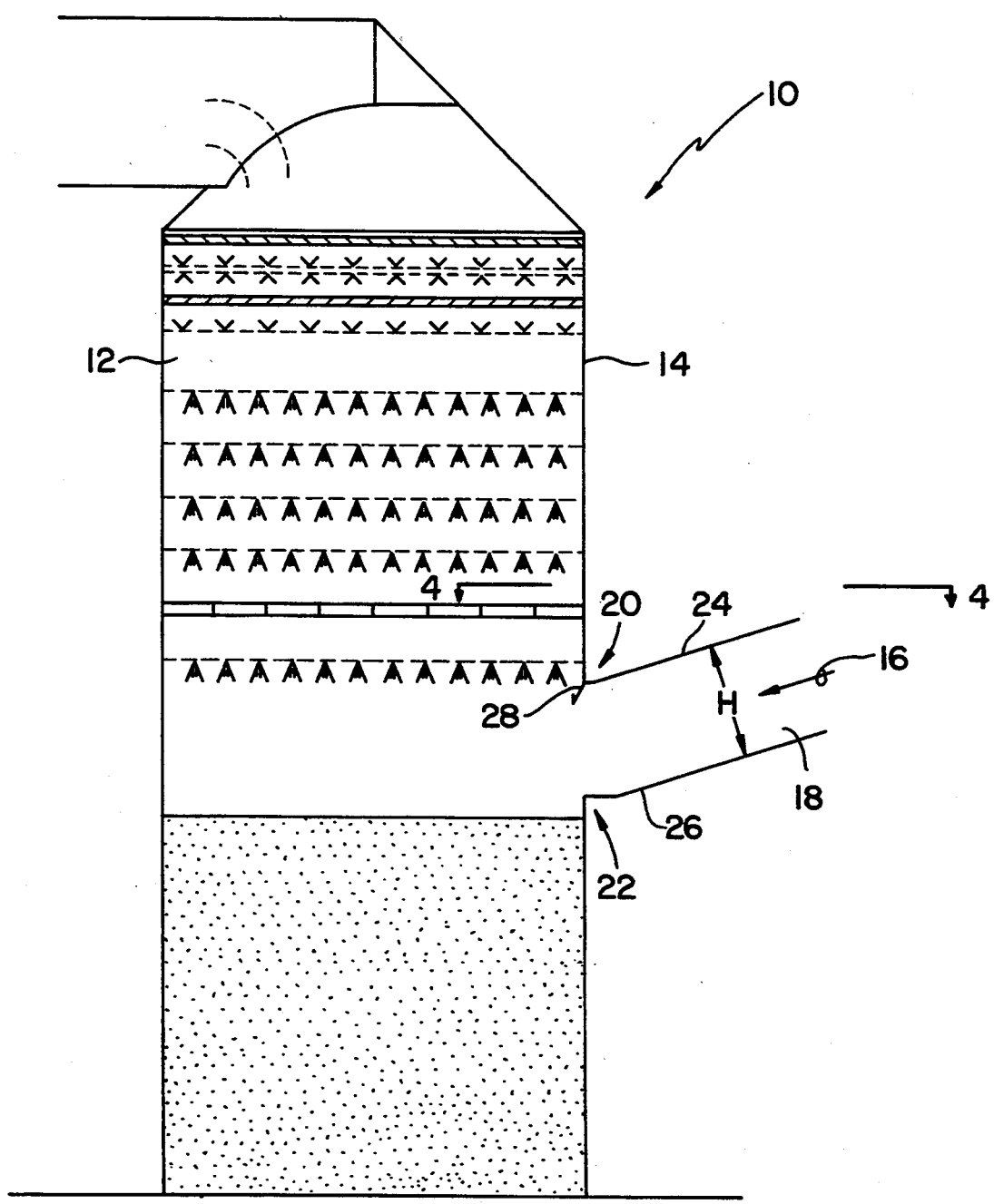

FIG. 10
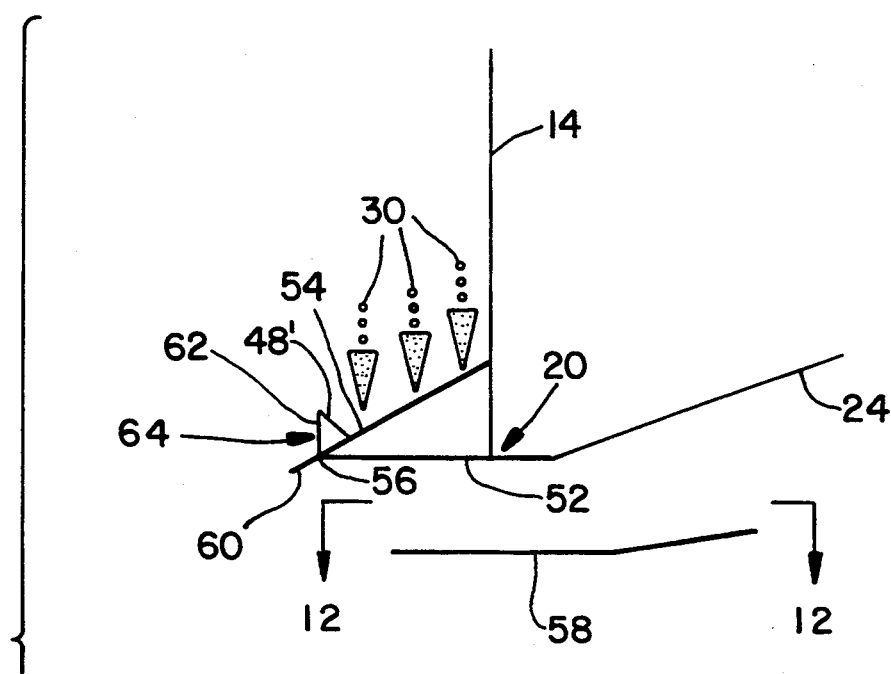
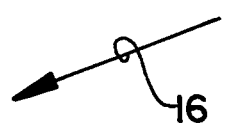
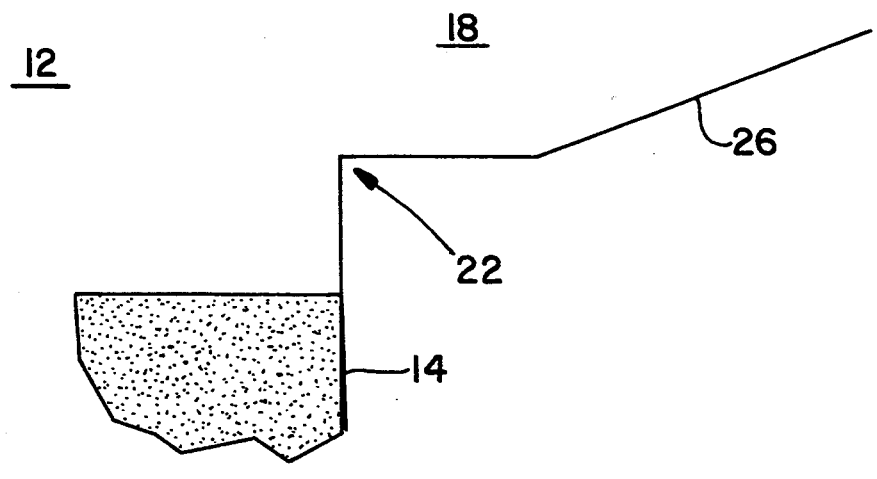

WET SCRUBBER INLET AWNING WITH LOW PRESSURE DROP

FIELD AND BACKGROUND OF THE INVENTION

The present invention relates, in general, to the cleaning of flue gas and, in particular, to a new and useful device for deflecting a slurry flow away from an inlet transition between an inlet flue and a housing of a wet scrubber module which serves to keep the inlet dry and thereby minimize deposition.

FIG. 1 is a schematic representation of a portion of a known wet flue gas desulfurization (FGD) system 10, wherein a wet scrubber module 12 having a cylindrical housing 14 receives a flue gas 16 at a transition between an inlet flue 18 and the housing. Inlet flue 18 typically approaches cylindrical housing 14 at a downward angle ranging from 0° to 90° from the horizontal. Inlet flue 18 is typically rectangular in cross-section, having a width W that is approximately 2.5 times greater than its height H (i.e., an aspect ratio of width to height W/H of approximately 2.5). At locations 20, 22 near an intersection of upper and lower surfaces 24, 26, respectively of inlet flue 18 and cylindrical housing 14, inlet flue 18 is mitered so that it intersects and attaches to cylindrical housing 14 at a 90° angle; i.e., inlet flue 18 is substantially perpendicular to cylindrical housing 14. This perpendicular orientation simplifies the transition, structural design and fabrication of the wet scrubber module 12. Prior to inlet flue 18, other portions (not shown) of the flue system upstream of inlet flue 18 may include cross-section transitions, elbows, fans, and/or other hydraulic devices to supply the flue gas 16 to the inlet flue 18.

As illustrated in FIGS. 2 and 3, within the cylindrical housing 14, an inlet awning 28 is used to direct part of the hot flue gas 16, typically provided to the wet scrubber module 12 at a temperature of approximately 300° F., downwardly at a 45° angle with respect to horizontal. Liquid slurry 30 that is sprayed within the wet scrubber module 12 and/or which drains from packing, trays, or other surfaces within the wet scrubber module 12, flows downwardly onto an upper surface 32 of the inlet awning 28. A weir plate 34 located above a tip 36 of the inlet awning 28 provides a gap 38 through which liquid slurry 30 passes, and thus regulates and improves the uniformity of a liquid slurry curtain 40 that is discharged down into the hot flue gas stream 16. As the hot flue gas 16 enters the wet scrubber module 12, it is quenched and humidified by the liquid slurry curtain 40, evaporating a fraction of the water present in the liquid slurry curtain 40.

In the absence of an inlet awning 28, a thin liquid film of liquid slurry 30 flowing downwardly along the walls of the wet scrubber module 12 contacts the hot flue gas 16. However, the amount of water present in the thin liquid film of slurry 30 falling across the inlet opening to the wet scrubber module 12 is not sufficient to completely quench and humidify the hot flue gas 16. The inlet awning 28 collects all the liquid slurry 30 that falls on top of it and channels the liquid slurry 30 to the gap 38 to form the thick liquid slurry curtain 40. This larger amount of water diverted by the inlet awning 28 and forming the liquid slurry curtain 40 exceeds what is needed for complete and instantaneous quenching and humidification of the hot flue gas 16. This complete and sudden quench and humidification reduces the wet/dry interface and the possibility of solid deposition.

In the absence of an inlet awning 28, if the liquid slurry 30 and hot flue gas 16 combination contacts arty surface of the inlet flue inlet 18 or housing 14, solid deposits will form as the liquid slurry 30 evaporates. Solids form at the wet/dry interface because the water present is not sufficient to continuously and fully humidify the incoming gas. These solid deposits build up over time, which requires the wet scrubber module 12 to be shut down so that maintenance personnel can enter the wet scrubber module 12 and remove the deposits. Shut down of a wet scrubber module 12 requires that either spare wet scrubber modules 12 be available to clean the flue gas 16, reduced boiler load so that the amount of flue gas produced does not exceed the capacity of the remaining on-line wet scrubber modules 12, or discharge of partially or untreated flue gas 16 directly into the atmosphere. All of these alternatives are undesirable and not accepted by the industry. It is thus preferable to maintain the wet/dry interface of the liquid slurry 30 with the hot flue gas 16 away from these surfaces, and the inlet awning 28 accomplishes this result by creating the liquid slurry curtain 40. The liquid slurry curtain 40 is maintained away from these surfaces because the inlet awning 28 extends downwardly and into the cylindrical housing 14 of wet scrubber module 12. The liquid slurry curtain 40 also provides more water than required for humidification.

As shown in FIGS. 4 and. 5, at the side ends 42 of the inlet awning 28, sidewalls 44 extend from the inlet awning 28 into the housing 14 and downwardly to a point below the lower surface 26 of inlet flue 18. These sidewalls 44 prevent liquid slurry 30 from flowing off the side ends 42 of the inlet awning 28 or along an inner surface 46 of the housing 14 from entering inlet flue 18. These sidewalls 44 are necessary to maintain an acceptable wet/dry interface away from these surfaces to avoid the deposition problems discussed earlier. In addition, the inlet awning 28 is provided with stiffeners 48 which, in conjunction with the sidewalls 44, further distribute the slurry flow 30 evenly about these surfaces.

Hydraulic testing of the known inlet flue 18 and inlet awning 28 devices described above revealed a significant flue gas side total pressure drop. High flue gas side pressure drops require increased fan pressure capability, resulting in increased fan and motor capacity and increased operating costs for the life of the unit. This is very undesirable because even a 1.0 inch $H_2O$ gas side pressure drop can be assessed at values which can reach one million dollars. Therefore, reducing the flue gas side pressure drop in the wet scrubber equipment is an effective way to reduce costs. However, such reductions must still be achieved in a manner which prevents unwanted deposition of dried slurry material at the transition.

SUMMARY OF THE INVENTION

The present invention provides a solution to the aforementioned problems by a construction which reduces the flue gas side pressure drop at a transition of an inlet flue which conveys hot flue gas and a wet FGD scrubber module which receives the hot flue gas, while still providing for minimized deposition of slurry deposits at the transition.

Accordingly, one aspect of the present invention is drawn to a device for deflecting a liquid slurry flow in a housing away from an inlet flue conveying hot flue gas to the housing, the device having an upper surface and communicating with the housing at an inner wall of the housing. The device comprises an inlet awning having a bottom portion horizontally extending into the housing from an upper surface of the inlet flue, and an inclined top portion connected to the bottom portion and an inner wall of the housing. The top portion extends upwardly at an incline from the bottom portion to the inner wall of the housing, the top portion having sufficient area to collect liquid slurry in excess of that required to achieve instant cooling and humidification of the hot flue gas, the top and bottom portions forming a tip at an area where the top portion is connected to the bottom portion. An extension outwardly extends from the tip of the inlet awning and slightly below the bottom portion of the inlet awning in order to deflect the liquid slurry flow away from the bottom portion of the inlet awning to keep the bottom portion dry.

The various features of novelty which characterize the invention are pointed out with particularity in the claims annexed to and forming a part of this disclosure. For a better understanding of the invention, its operating advantages and specific results attained by its uses, reference is made to the accompanying drawings and descriptive matter in which a preferred embodiment of the invention is illustrated.

BRIEF DESCRIPTION OF THE DRAWINGS

In the drawings:

FIG. 1 is a schematic sectional side view illustrating a wet scrubber module and
its associated inlet flue;

FIG. 10 is a schematic sectional side view illustrating a second embodiment of an inlet flue transition using the device according to the present invention in combination with a weir plate;

DESCRIPTION OF THE PREFERRED EMBODIMENTS

Figures 2, 3:
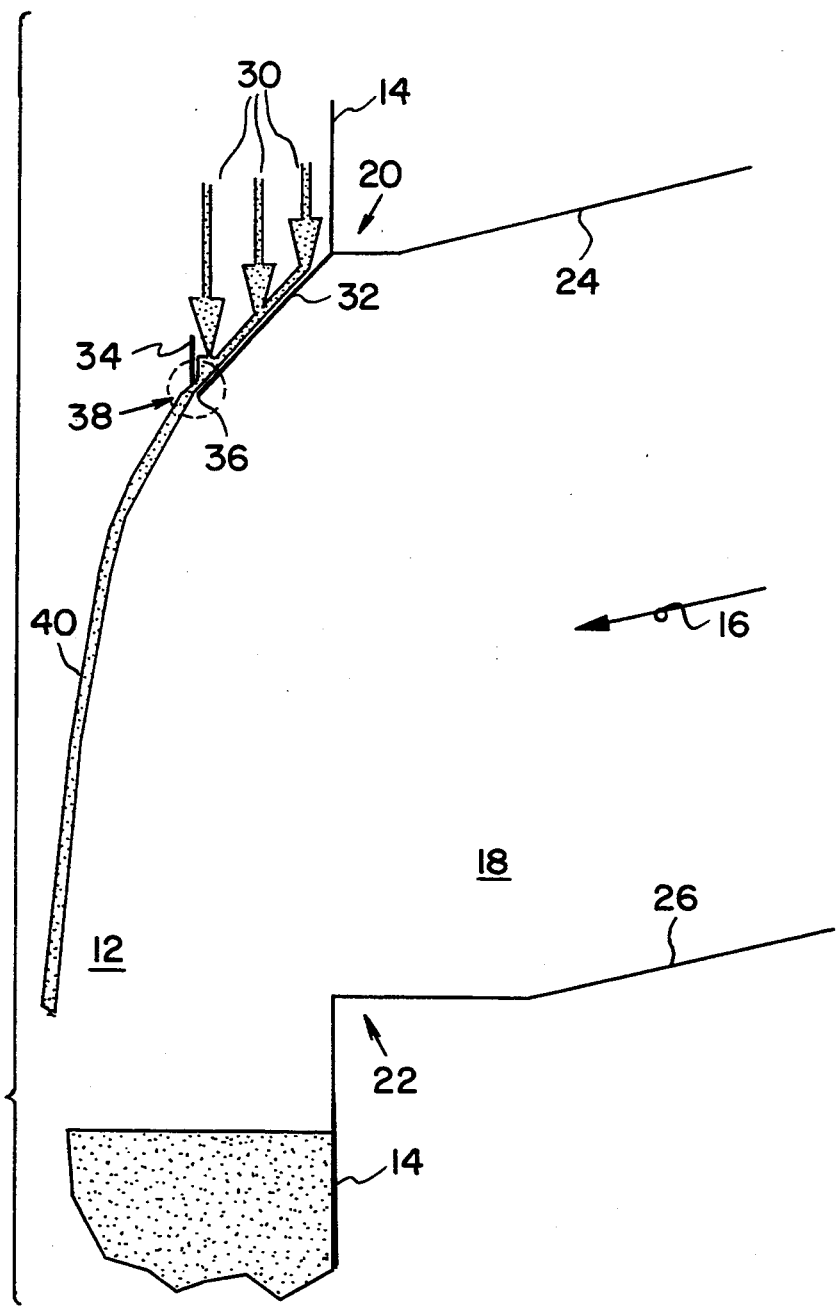
FIG. 2 is a schematic sectional side view of the transition between the inlet flue
and the wet scrubber module of FIG. 1.
FIG. 3 is a schematic sectional view illustrating a portion of FIG. 2.
Figure 4:
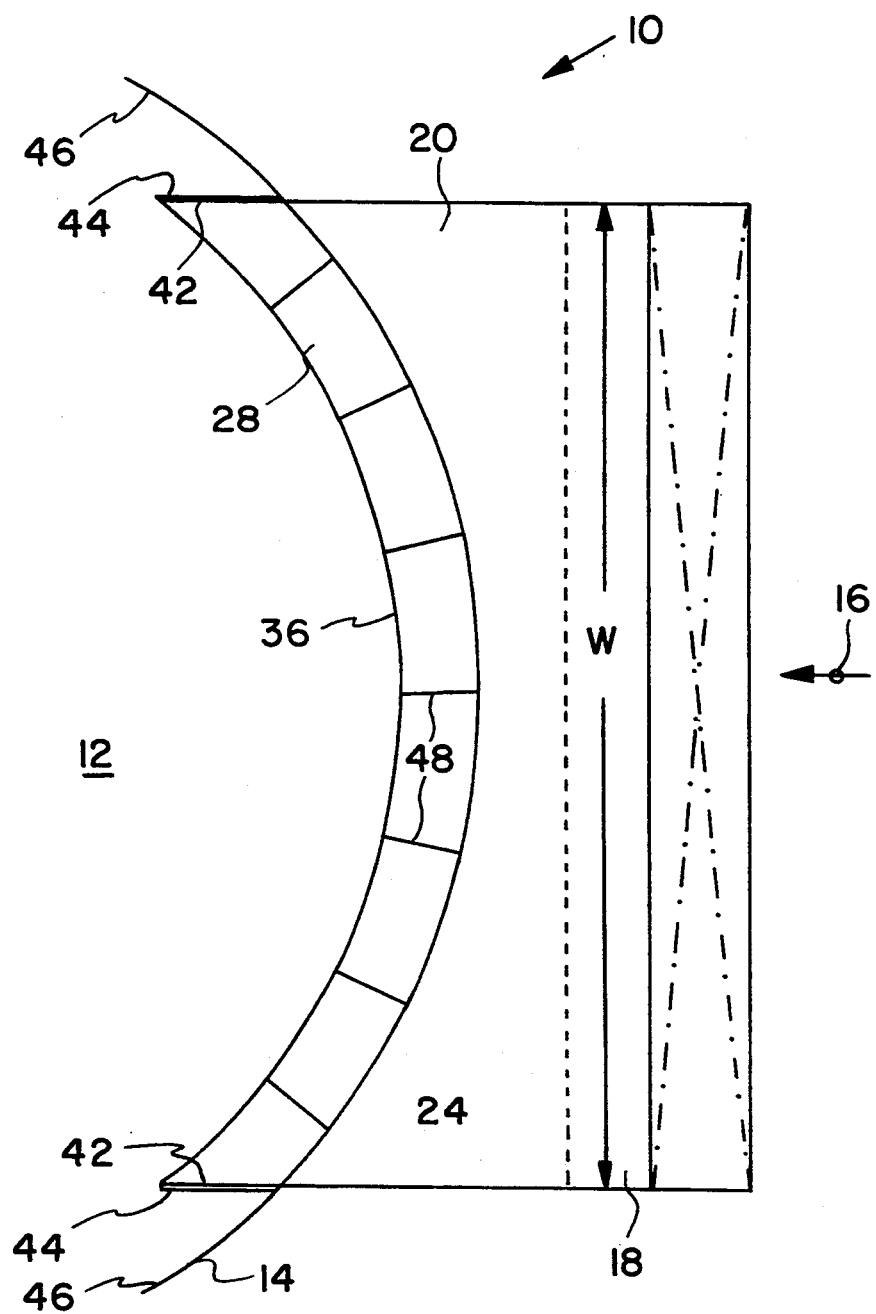
FIG. 4 is a sectional plan view taken in the directions of arrows 4—4 of FIG. 1.
Figure 5:
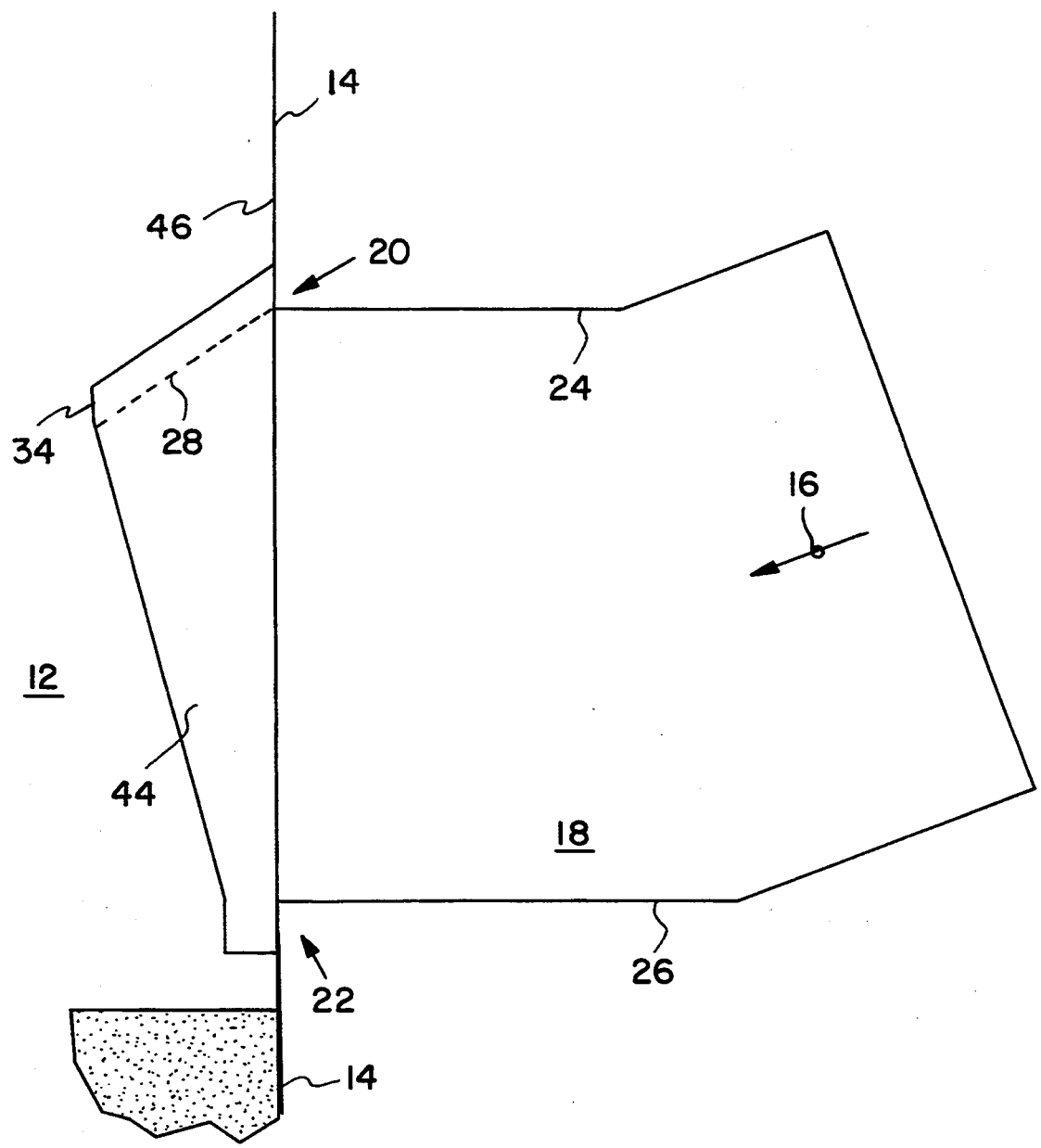
FIG. 5 is a schematic sectional side view illustrating a side wall for the inlet awning of FIG. 1.
Figure 6:
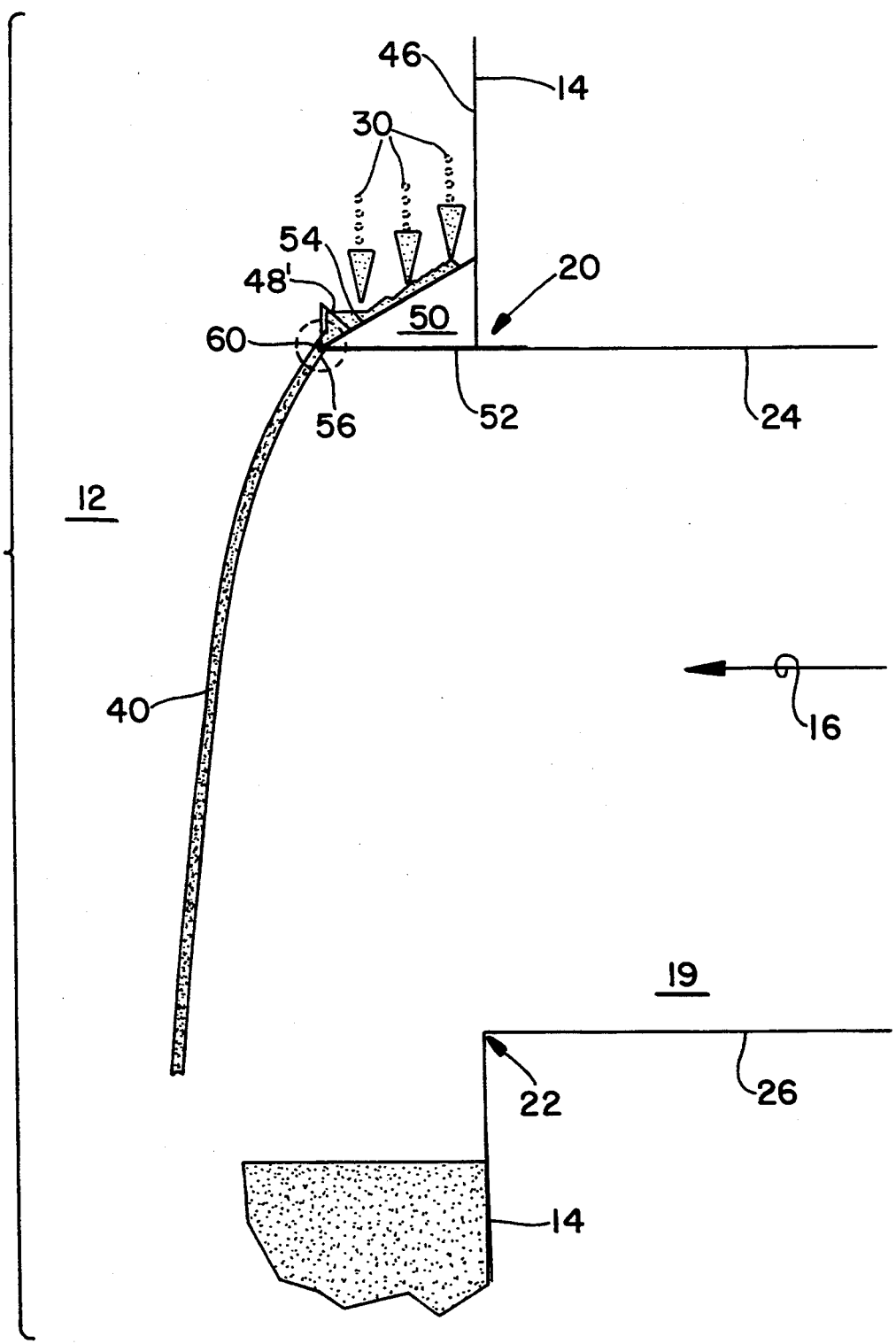
FIG. 6 is a schematic sectional side view illustrating an inlet flue transition using the device according to the present invention in combination with a weir plate.

Referring to the drawings generally, wherein like numerals designate the same or similar elements throughout the several drawings, and to FIG. 6 in particular, there is shown a first embodiment of the present invention which comprises an inlet flue 19 communicating with the housing 14 of a wet scrubber module 12 for supplying hot flue gas 16 thereto. Inlet flue 19 has upper surface 24 and lower surface 26. An inlet awning 50 is provided having a bottom portion 52 which is connected to and which extends horizontally into the wet scrubber module 12 from the upper surface 24 of the inlet flue 19. Alternatively, the bottom portion 52 can also be an extension of the upper surface 24. Inlet awning 50 also has a top portion 54 connected to the bottom portion 52 at a tip 56. Top portion 54 is inclined upwardly towards the inner surface 46 of the housing 14 and is connected thereto. The top portion 54 is oriented at an inclined angle from the horizontal in order to direct the liquid slurry flow 30 towards the inner portion of the housing 14, and downwardly away from the inlet flue 19. The inclined top portion 54 prevents deposition and build-up of slurry solids that would normally occur on a fiat surface. The extension of the top portion 54 into housing 14 is sized to have an area sufficient to capture an amount of falling liquid slurry flow 30 in excess of that required to achieve instant cooling of, and to completely humidify, the inlet flue gas 16 as it flows through the liquid slurry curtain 40.

The amount of hot flue gas 16 entering the wet scrubber module 12 and the FGD chemistry process determines how much liquid slurry is needed for flue gas desulfurization. The degree to which the top portion 54 extends into the housing 14 depends on how much liquid flow slurry flow 30 is needed to provide cooling and humidification of the inlet flue gas 16 while preventing de, position at the inlet. Of course this requires a knowledge of the flow characteristics and distribution within the wet scrubber module 12 which would be available to those skilled in the art employing the present invention. By way of example and not limitation, if a significant amount of liquid flow slurry 30 is present at the inlet to the wet scrubber module 12, the inlet awning 50 need not extend very far into the wet scrubber module 12 from the housing 14. Conversely, if a reduced amount of liquid slurry flow 30 is available at the inlet to the wet scrubber module 12, a larger inlet awning 50 will be required which extends further from the housing 14 into the wet scrubber module 12 thus providing a greater area to capture the falling liquid slurry flow 30 and creating the liquid slurry curtain 40. Similarly, a particular angle of inclination of top portion 54 with respect to the horizontal could also be affected by the amount of liquid slurry flow 30 falling thereon. This will affect the angle at which the liquid slurry curtain 40 falls off of the inlet awning 50 into the bottom portion of the wet scrubber module 12. It is important to ensure that the liquid slurry curtain 40 extends far enough in to the housing 14 to prevent splashing of liquid slurry back on to the lower surface 26 of the inlet flue 19 because unwanted deposition can also occur at this location. Suitable combinations of inlet awning 50 area and angle of inclination of the top portion 54 can thus be selected to achieve the desired results. In the preferred embodiment, the top portion 54 is inclined at an angle with respect to the horizonal within a range of approximately of 20°–45° with the preferred angle being 30°. Also, to protect the inlet from backsplashing, the angle between a line drawn from lower surface corner 22 and tip 60 with respect to the vertical is within a range of approximately 10°–20° with the preferred angle being 13°.

Figure 7:
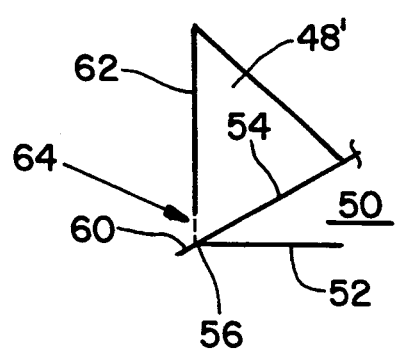
FIG. 7 is an enlarged schematic sectional view illustrating the circled/dotted portion of FIG. 6.

The bottom portion 52 of inlet awning 50, as a horizontal extension of the upper surface 24, is exposed to dry, hot flue gas 16 next to it either by using a straight approach inlet flue 19, such as that shown in FIG. 6, or one which incorporates turning vanes 58 therein, as shown in FIG. 10. As shown in FIG. 7 an awning extension 60 extends outwardly and slightly below tip 56 of bottom portion 52 to keep it dry. For a typical wet scrubber module 12, the awning extension 60 should extend approximately at least one inch below the bottom portion 52 of inlet awning 50.

Figure 9:
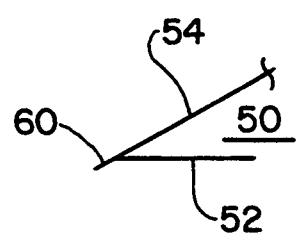
FIG. 9 is a schematic sectional view illustrating a portion of FIG. 8.
Figure 11:
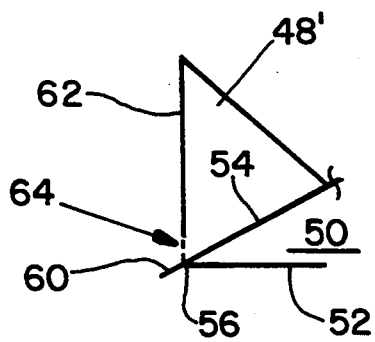
FIG. 11 is an enlarged schematic sectional side view illustrating the circled/dotted portion of FIG. 10.
Figure 8:
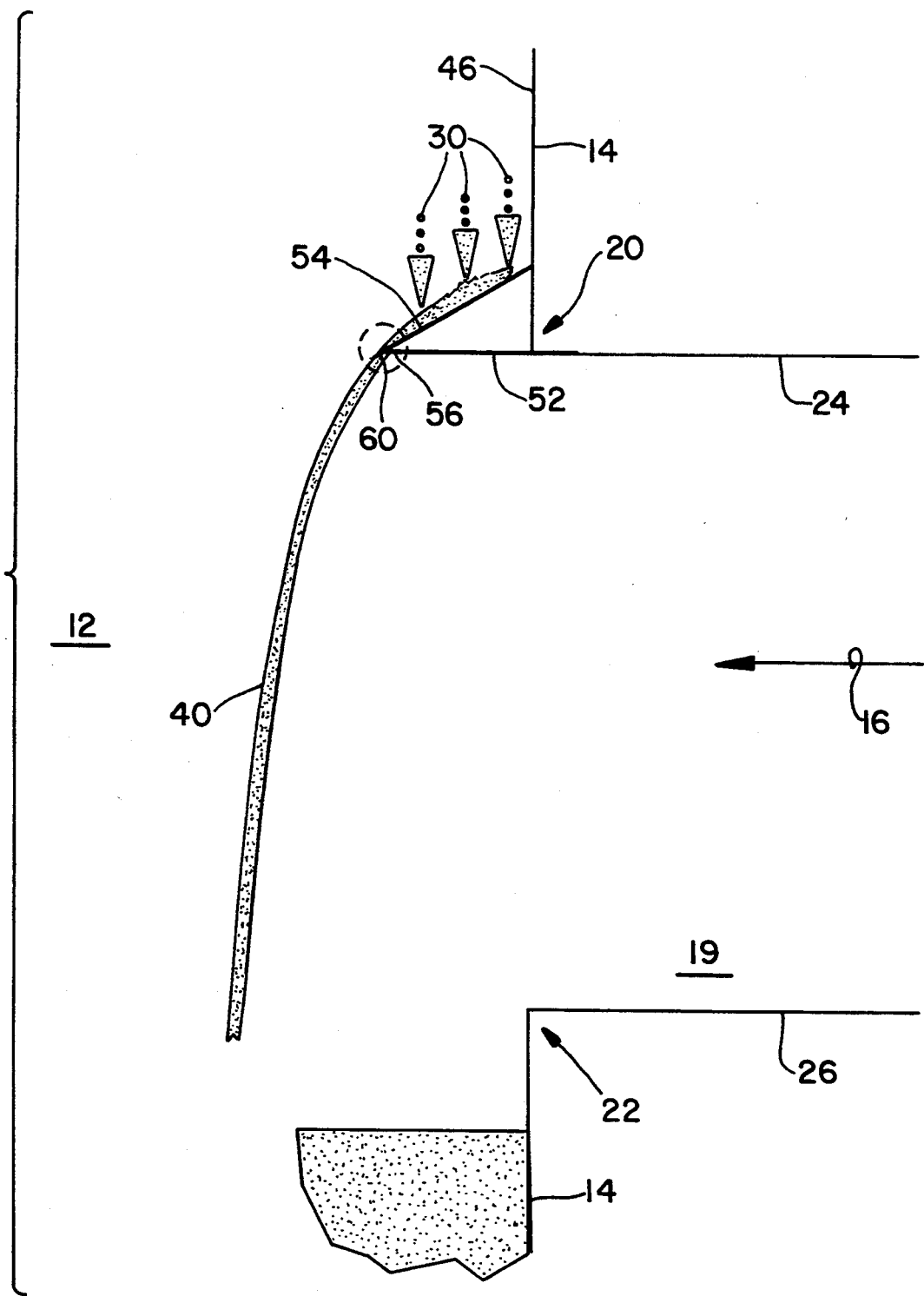
FIG. 8 is a schematic sectional view similar to FIG. 6 without a weir plate.

Above the tip 56 or awning extension 60 of inlet awning 50 there may be located an optional weir plate 62 which functions as does the weir plate 34 in known designs, providing a gap 64 through which liquid slurry 30 passes, to regulate and improve the uniformity of a liquid slurry curtain 40 that is discharged down into the hot flue gas stream 16. Small stiffener gusset plates 48' would be employed as necessary for structural support of the weir plate 62, but would be omitted if weir plate 62 is not required. Liquid slurry flow 30 that is sprayed within the wet scrubber module 12 and/or which drains from packing, trays, other devices within the wet scrubber module 12 flows downwardly onto the top portion 54 of inlet awning 50. This liquid slurry flow 30 is momentarily held back by weir plate 62, if provided as shown in FIGS. 6 and 7, such that liquid slurry flow 30 is channeled through gap 64, or it can immediately flow off of the inlet awning 50 as shown in FIGS. 8 and 9 if weir plate 62 is omitted. The weir plate 62 is desirable at low wet scrubber module 12 liquid slurry 30 fluxes that may not otherwise flow uniformly off of the inlet awning 50. In both cases, the liquid slurry 30 flows from the inlet awning 50 and forms the thick liquid slurry curtain 40 that quenches and humidifies the hot flue gas 16 entering the wet scrubber module 12 through the inlet flue 18 or 19. The location of the liquid slurry curtain 40 defines the wet/dry interface which, in a wet scrubber, needs to be kept away from the inlet flue 18 or 19 and inner surface 46 so that deposits do not form.

Figure 12:
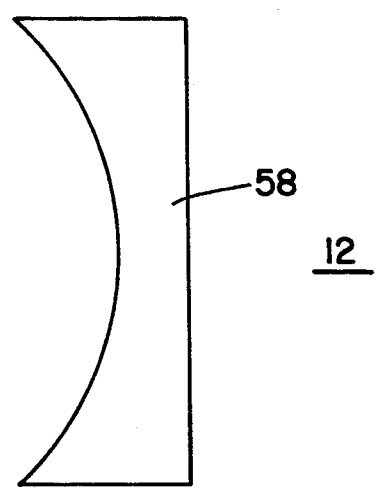
FIG. 12 is sectional plan view of a vane taken in the directions of arrows 12—12 of FIG. 10.

It is also necessary to ensure that the hot flue gas 16 flows along the upper surface 24 and bottom portion 52 of inlet awning 50 and is not separated. Flow separation from the upper surface 24 of the inlet flue can be caused by a sudden or mitered bend in the inlet flue 18 which is commonly found in the known designs. However, this flow separation does not occur in the straight inlet flue 19 illustrated in FIGS. 6 and 8. If the inlet flue has such a mitered bend, one or more turning vanes 58 located in the inlet flue 18 as illustrated in FIGS. 10 and 12 will effectively direct the incoming hot flue gas 16 along the upper surface 24. The hot flue gas flowing along the upper surface 24 and bottom portion 52 of inlet awning 50 prevents deposits from forming thereon. The shape, number, and size of turning vanes 58 used depends upon the specific flue gas profiles encountered and the application of known engineering principles.

Figure 13:
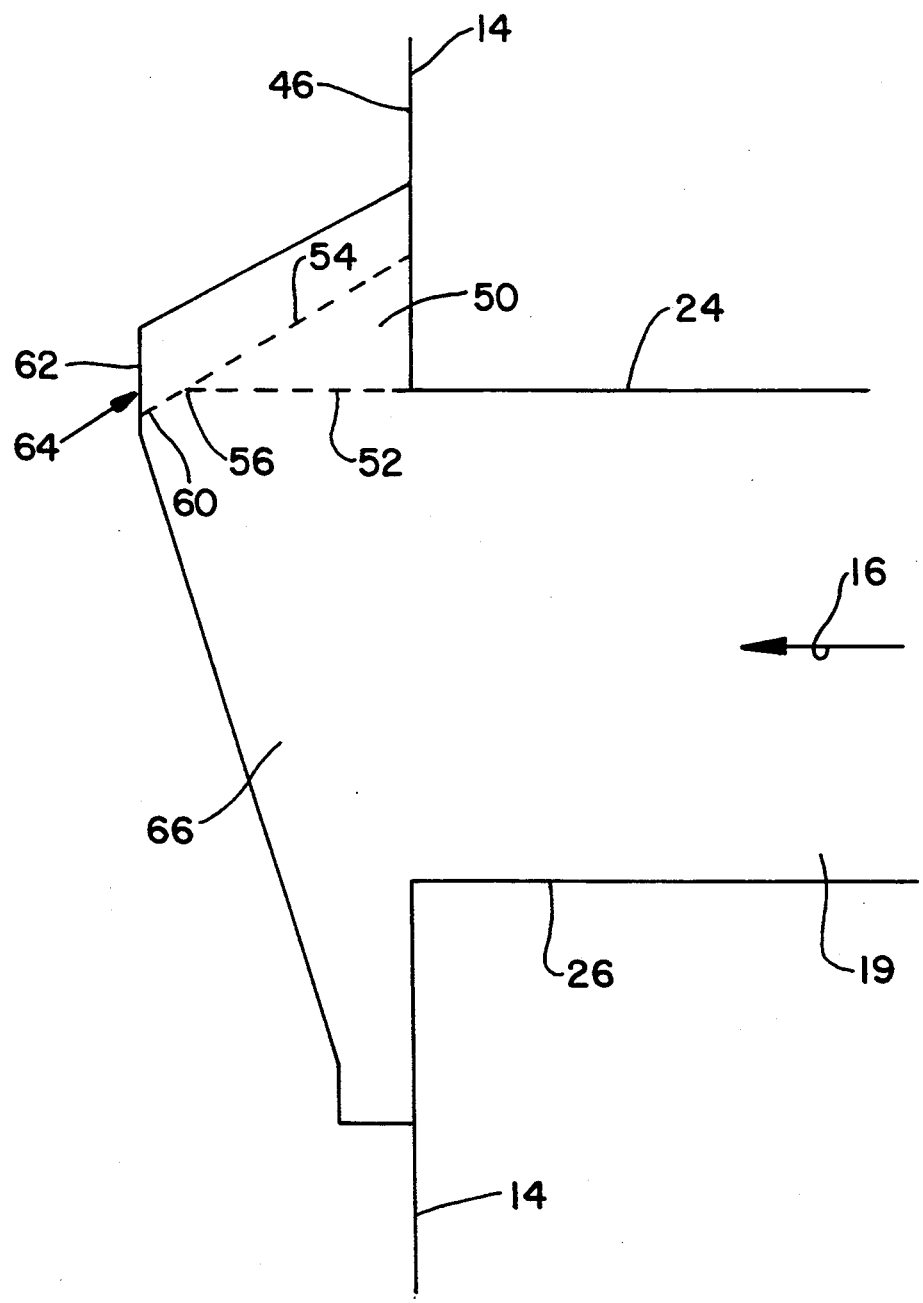
FIG. 13 is a schematic sectional side view illustrating a side wall used in conjunction with the present invention.

As shown in FIG. 13, and in a fashion similar to those designs employing known inlet awning 28, sidewalls 66 extend from the sides of inlet awning 50 downwardly to a point below the lower surface 26 of inlet flue 18, and can also be employed for inlet flues 18. The sidewalls 66 prevent liquid slurry 30 from flowing off the sides of the inlet awning 50 or along the inner surface 46 of the wet scrubber module 12 and also serve to prevent the liquid slurry 30 from entering the inlet flue 18, or 19 to avoid the aforementioned deposition problems.

The inlet awning 50 of the present invention increases the height H and the cross-sectional flow area between the bottom portion 52 of inlet awning 50 and the lower surface 26 of inlet flue 18 or 19. This results in reduced flue gas flow velocity and gas side pressure drop. Flow model testing of the present invention predicts a reduction of an inlet gas side total pressure drop of approximately 33% as compared to the previous inlet awning design at typical wet scrubber module operating conditions. Furthermore, during flow model testing of the present invention, flow visualization of the wet/dry interface proved that the bottom portion 52 of the inlet awning 50 and the upper surface 24 of the inlet flue were not wetted, thus maintaining the desired deposition-free characteristics.

While specific embodiments of the invention have been shown and described in detail to illustrate the application of the principles of the invention, it will be understood that the invention may be embodied otherwise without departing from such principles. By way of example and not limitation, the principles of the present invention can be used in new construction as well as in a retrofit application into existing wet flue gas desulfurization systems in order to achieve reduced gas side pressure drop, or to simplify the wet scrubber structural arrangement. Similarly, while the foregoing discussion was presented in the context of rectangular inlet flue configurations and a specific or preferred aspect ratio (ratio of flue width W to flue height H; i.e., W/H) it will be readily appreciated to those skilled in the art that alternate cross-sectional inlet flue configurations (square, cylindrical or other) can be employed, as well as those having different aspect ratios (for example, within a range of approximately 1.0 to 4.0). All such variations are thus properly considered to be within the scope of the following claims.

We claim:

1. A device for deflecting a liquid slurry flow in a housing away from an inlet flue for conveying hot flue gas to the housing, the device having an upper surface and communicating with the housing at an inner wall of the housing, the device comprising:

an inlet awning having a bottom portion horizontally extending into the housing from an upper surface of the inlet flue, and an inclined top portion connected to the bottom portion and an inner wall of the housing, the top portion extending upwardly at an incline from the bottom portion to the inner wall of the housing, the top portion having sufficient area to collect liquid slurry in excess of that required to achieve instant cooling and humidification of the hot flue gas, the top and bottom portions forming a tip at an area where the top portion is connected to the bottom portion; and an extension outwardly extending from the tip of the inlet awning and slightly below the bottom portion of the inlet awning in order to deflect the liquid slurry flow away from the bottom portion of the inlet awning to keep the bottom portion dry.

2. The device according to claim 1, further including a weir plate located within the housing and spaced a distance away from the tip of the inlet awning so as to define a gap between the tip and the weir plate through which a portion of the liquid slurry flow passes.

3. The device according to claim 1, further including vane means in the inlet flue for directing a flow of flue gas into the housing, the vane means extending from the inlet flue into the housing and located near the upper surface of the inlet flue and the bottom portion of the inlet awning.

4. The device according to claim 1, wherein the inlet flue is cylindrical in cross-section.

5. The device according to claim 1, further comprising side wall means extending from the inlet awning at the inner wall of the housing for further deflecting the liquid slurry flow away from the inlet flue.

6. The device according to claim 5, wherein the extension extends approximately 1 inch beyond the tip of the inlet awning.

7. The device according to claim 1, wherein the inlet flue is rectangular in cross-section.

8. The device according to claim 7, wherein the rectangular inlet flue has an aspect ratio within a range, of approximately 1.0 to 4.0.

9. The device according to claim 1, wherein the top portion is inclined at an angle within a range of approximately 20°–45° with respect to the horizontal.

10. The device according to claim 9, wherein an angle between a line drawn from a point located at an intersection of a lower surface of the inlet flue and the housing and the tip of the inlet awning with respect to the vertical is within a range of approximately 10°–20°.

11. The device according to claim 10, wherein the angle is approximately 13°.

12. In combination with a wet scrubber module used in the desulfurization of hot flue gas, the wet scrubber module having a housing and an inlet flue for conveying hot flue gas to the housing and means for supplying a liquid slurry flow into the housing above the inlet flue, a device for deflecting the liquid slurry flow falling down within the housing away from the inlet flue to prevent deposition and build up of solids at the inlet, the device having an upper surface and communicating with the housing at an inner wall of the housing and further comprising:

an inlet awning having a bottom portion horizontally extending into the housing from an upper surface of the inlet flue, and an inclined top portion connected to the bottom portion and an inner wall of the housing, the top portion extending upwardly at an incline from the bottom portion to the inner wall of the housing, the top portion having sufficient area to collect liquid slurry in excess of that required to achieve instant cooling and humidification of the hot flue gas, the top and bottom portions forming a tip at an area where the top portion is connected to the bottom portion; and an extension outwardly extending from the tip of the inlet awning and slightly below the bottom portion of the inlet awning in order to deflect the liquid slurry flow away from the bottom portion of the inlet awning to keep the bottom portion dry.

* * * * *